(12) United States Patent
Moore

(10) Patent No.: US 8,784,762 B2
(45) Date of Patent: Jul. 22, 2014

(54) TREATMENT OF $NO_x$-CONTAINING GAS STREAMS

(75) Inventor: James A. Moore, Beaver, PA (US)

(73) Assignee: ATI Properties, Inc., Albany, OR (US)

( * ) Notice: Subject to any disclaimer, the term of this patent is extended or adjusted under 35 U.S.C. 154(b) by 0 days.

(21) Appl. No.: 13/027,312

(22) Filed: Feb. 15, 2011

(65) Prior Publication Data

US 2012/0207665 A1    Aug. 16, 2012

(51) Int. Cl.
*C01B 21/40* (2006.01)
*C23G 1/02* (2006.01)
*B01D 53/56* (2006.01)

(52) U.S. Cl.
CPC . *C01B 21/40* (2013.01); *C23G 1/02* (2013.01); *B01D 53/56* (2013.01)
USPC .......................................... 423/235; 423/393

(58) Field of Classification Search
CPC .... B01D 53/56; B01D 53/60; B01D 53/8625; B01D 53/8637; B01D 53/9409; B01D 53/40; B01D 53/402; B01D 53/404; C23G 1/02–1/088; C01B 21/40
USPC ................ 423/239.1, 235, 242.1, 390.1, 393, 423/394.2
See application file for complete search history.

(56) References Cited

U.S. PATENT DOCUMENTS

| | | |
|---|---|---|
| 3,015,588 A | 1/1962 | Hyams |
| 3,652,227 A | 3/1972 | Harman, III et al. |
| 3,673,245 A | 6/1972 | Mims |
| 3,852,412 A | 12/1974 | Brenner |
| 4,035,296 A | 7/1977 | Armstrong |
| 4,138,470 A | 2/1979 | Bolme |
| 4,142,874 A | 3/1979 | Vaseen |
| 4,247,321 A | 1/1981 | Persinger |
| 4,351,810 A * | 9/1982 | Martinez et al. .............. 423/235 |
| 4,352,740 A | 10/1982 | Grader et al. |
| 4,565,675 A | 1/1986 | Uchino et al. |
| 5,639,434 A | 6/1997 | Patrikainen et al. |
| 5,985,223 A * | 11/1999 | Saxena et al. ................. 423/235 |
| 6,063,348 A | 5/2000 | Hinke et al. |

(Continued)

FOREIGN PATENT DOCUMENTS

| | | |
|---|---|---|
| EP | 0962247 A2 | 12/1999 |
| EP | 1332786 A2 | 8/2003 |
| GB | 1229107 | 4/1971 |

OTHER PUBLICATIONS

Higgins, "Industrial Processes to Reduce Generation of Hazardous Waste at DOD Facilities," 1985, CHM Hill, pp. 7-3 to 7-4.*

(Continued)

*Primary Examiner* — Stanley Silverman
*Assistant Examiner* — Justin Bova
(74) *Attorney, Agent, or Firm* — K & L Gates LLP; John E. Grosselin, III

(57) ABSTRACT

Methods and systems for treating a gas stream comprising $NO_x$ are disclosed. In one embodiment of the method, the gas stream comprising $NO_x$ is reacted with ozone to form oxidation products including nitrogen sesquioxide and nitrogen pentoxide. At least a portion of the nitrogen sesquioxide and nitrogen pentoxide is reacted with water to form nitric acid, and a solubilized form of the nitric acid is collected and may be reused or otherwise utilized. Systems for conducting the method also are disclosed.

15 Claims, 2 Drawing Sheets

(56) References Cited

U.S. PATENT DOCUMENTS

| | | | |
|---|---|---|---|
| 6,162,409 A * | 12/2000 | Skelley et al. | 423/239.1 |
| 6,193,934 B1 | 2/2001 | Yang | |
| 6,322,756 B1 | 11/2001 | Arno et al. | |
| 6,649,132 B1 | 11/2003 | Hwang et al. | |
| 6,761,863 B2 * | 7/2004 | Hwang et al. | 423/235 |
| 7,632,475 B2 | 12/2009 | Suchak et al. | |
| 7,669,439 B2 | 3/2010 | Simpson et al. | |
| 7,766,995 B2 | 8/2010 | Suchak et al. | |
| 7,794,523 B2 | 9/2010 | Whitlock | |
| 8,192,556 B2 | 6/2012 | Giordani et al. | |
| 2012/0207664 A1 | 8/2012 | Moore | |

OTHER PUBLICATIONS

Sulzer, "Gas-Gas mixing as applied to SCR's" 2003, NETL Conference, Slides 1-30.*

Fox et al., "Steel Pickling: A Profile", Dec. 1993, US EPA, 134 pages.

* cited by examiner

TREATMENT OF $NO_x$-CONTAINING GAS STREAMS

TECHNICAL FIELD

The present disclosure is directed to methods and systems for treating gases comprising $NO_x$.

BACKGROUND

Many manufacturing treatment and combustion processes produce gases that include gaseous nitrogen oxides ($NO_x$) and other undesirable gaseous products. For example, processes for acid pickling stainless steels and other alloys, which typically involve immersing the alloys for a time in a bath of a strongly acidic solution including nitric acid, result in gases above the bath that include $NO_x$. Federal and local environmental laws may limit the content of $NO_x$ that is discharged into the atmosphere. In the past decades, manufacturing companies have undertaken considerable efforts to reduce the amount of $NO_x$ discharged into the atmosphere.

One known method of removing $NO_x$ from a gas stream includes contacting the gas stream with ozone to thereby oxidize the $NO_x$ in the gas stream and form oxidation products such as nitrogen sesquioxide and nitrogen pentoxide. The oxidation products produced by the ozone treatment may be collected using aqueous scrubbers, for example, stored on-site, and discarded as a liquid waste stream. Discarding the liquid waste material may require third-party waste collection and disposal services.

It would be advantageous to provide an alternative method for removing $NO_x$ from the gases produced in an alloy pickling process or other manufacturing treatment or combustion process that results in a reduced amount of waste. More generally, it would be advantageous to provide a method for removing $NO_x$ from a gas stream produced in any process and that results in a reduced amount of waste.

SUMMARY

One aspect according to the present disclosure is directed to methods for treating a gas stream comprising $NO_x$. The methods include contacting a gas stream comprising $NO_x$ with ozone to thereby form oxidation products including nitrogen sesquioxide and nitrogen pentoxide. The methods further comprise reacting at least a portion of the nitrogen sesquioxide and nitrogen pentoxide with water to thereby form nitric acid, and recovering at least a portion of the nitric acid.

An additional aspect according to the present disclosure is directed to methods for treating a gas stream comprising $NO_x$, wherein the gas stream is produced in a process for pickling an alloy including contacting the alloy with an acidic solution comprising nitric acid. For example, the pickling process may comprise at least one of immersing the alloy in an acidic solution or spraying an acidic solution on the alloy. The methods comprise contacting the gas stream comprising $NO_x$ with ozone to thereby form oxidation products including nitrogen sesquioxide and nitrogen pentoxide. The methods further comprise reacting at least a portion of the nitrogen sesquioxide and nitrogen pentoxide with water to thereby form nitric acid, and recovering at least a portion of the nitric acid. In certain embodiments, at least a portion of the recovered nitric acid may be recycled back to the acidic solution used in the pickling treatment.

A further aspect according to the present disclosure is directed systems for treating a gas stream comprising $NO_x$. The systems comprise a first chamber and a second chamber. The first chamber includes a first inlet communicating with a source of a gas comprising $NO_x$, and a second inlet communicating with a source of ozone. The first chamber also includes an interior volume adapted to contact the gas comprising $NO_x$ gas with ozone, thereby producing intermediate products including nitrogen sesquioxide and nitrogen pentoxide. At least of portion of the nitrogen sesquioxide and nitrogen pentoxide react within the first chamber with water to form nitric acid. The second chamber receives gases from the first chamber. The second chamber includes a third inlet communicating with a source of water vapor and an interior volume adapted to contact gases from the first chamber with water vapor, thereby solubilizing nitric acid in the gases in the water vapor. The second chamber further includes an outlet for recovering at least a portion of the solubilized nitric acid.

In one particular embodiment of a system for treating a gas stream comprising $NO_x$ according to the present disclosure, the system is associated with an acid pickling apparatus for pickling an alloy. Gases including $NO_x$ produced by the acid pickling apparatus may be treated using the system so as to recover nitric acid. Optionally, at least a portion of the recovered nitric acid is recycled to the acid pickling apparatus.

It is understood that the invention disclosed and described herein is not limited to the embodiments disclosed in this Summary.

BRIEF DESCRIPTION OF THE DRAWINGS

The characteristics of various non-limiting embodiments disclosed and described herein may be better understood by reference to the accompanying figures, in which.

Figure 1:
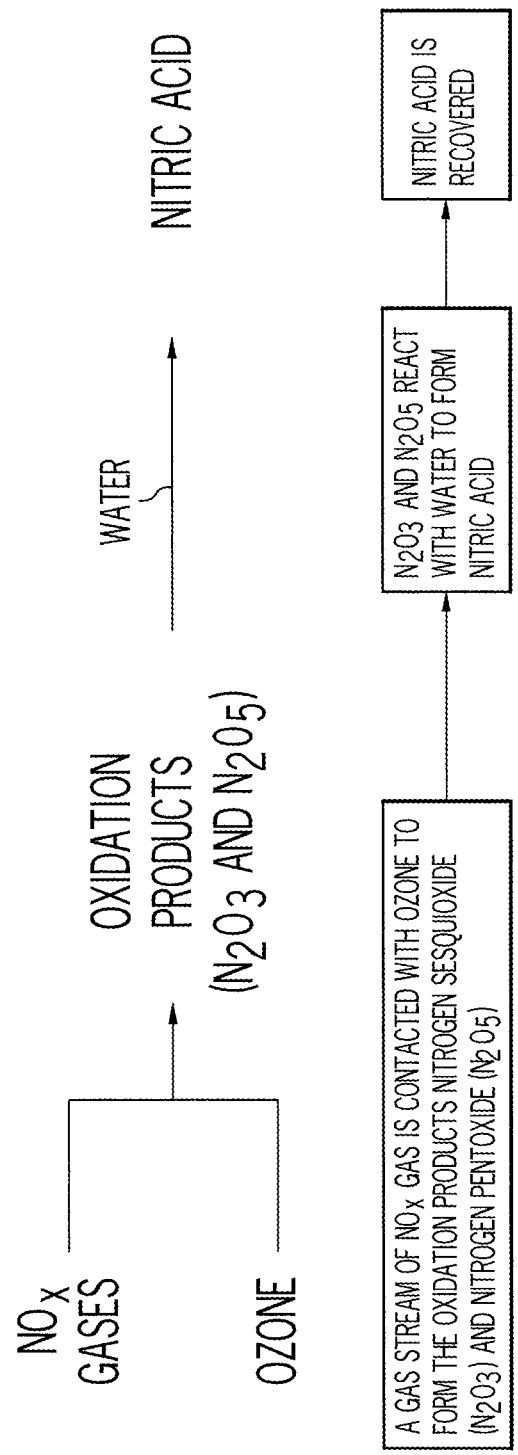
FIG. 1 is a flow diagram showing certain steps of a non-limiting embodiment of a method for treating a gas stream comprising $NO_x$ gas according to the present disclosure.

The reader will appreciate the foregoing details, as well as others, upon considering the following detailed description of certain non-limiting embodiments according to the present disclosure. The reader may also comprehend additional details upon implementing or using embodiments described herein.

DETAILED DESCRIPTION OF CERTAIN NON-LIMITING EMBODIMENTS

It is to be understood that the descriptions of the disclosed non-limiting embodiments herein may have been simplified to illustrate only those features and characteristics that are relevant to a clear understanding of the disclosed embodiments, while eliminating, for purposes of clarity, other features and characteristics. Persons having ordinary skill in the art, upon considering this description of the disclosed embodiments, will recognize that other features and characteristics may be desirable in a particular implementation or application of the disclosed embodiments. However, because such other features and characteristics may be readily ascertained and implemented by persons having ordinary skill in the art upon considering this description of the disclosed embodiments, and are, therefore, not necessary for a complete understanding of the disclosed embodiments, a description of such features, characteristics, and the like, is not provided herein. As such, it is to be understood that the description set forth herein is merely exemplary and illustrative of the disclosed embodiments and is not intended to limit the scope of the invention defined by the claims.

In the present disclosure, other than where otherwise indicated, all numerical parameters are to be understood as being prefaced and modified in all instances by the term "about", in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited herein is intended to include all sub-ranges subsumed within the recited range. For example, a range of "1 to 10" is intended to include all sub-ranges between (and including) the recited minimum value of 1 and the recited maximum value of 10, that is, having a minimum value equal to or greater than 1 and a maximum value equal to or less than 10. Any maximum numerical limitation recited herein is intended to include all lower numerical limitations subsumed therein and any minimum numerical limitation recited herein is intended to include all higher numerical limitations subsumed therein. Accordingly, Applicant reserves the right to amend the present disclosure, including the claims, to expressly recite any sub-ranges subsumed within the ranges expressly recited herein. All such ranges are intended to be inherently disclosed herein such that amending to expressly recite any such sub-ranges would comply with the requirements of 35 U.S.C. §112, first paragraph, and 35 U.S.C. §132(a).

The grammatical articles "one", "a", "an", and "the", as used herein, are intended to include "at least one" or "one or more", unless otherwise indicated. Thus, the articles are used herein to refer to one or more than one (i.e., to "at least one") of the grammatical objects of the article. By way of example, "a component" means one or more components, and thus, possibly, more than one component is contemplated and may be employed or used in an implementation of the described embodiments. Further, the use of a singular noun includes the plural, and the use of a plural noun includes the singular, unless the context of the usage indicates otherwise.

Any patent, publication, or other disclosure material that is said to be incorporated by reference herein, is incorporated herein in its entirety unless otherwise indicated, but only to the extent that the incorporated material does not conflict with existing definitions, statements, or other disclosure material expressly set forth in this description. As such, and to the extent necessary, the express disclosure as set forth herein supersedes any conflicting material incorporated by reference herein. Any material, or portion thereof, that is said to be incorporated by reference herein, but which conflicts with existing definitions, statements, or other disclosure material set forth herein is only incorporated to the extent that no conflict arises between that incorporated material and the existing disclosure material. Applicant reserves the right to amend the present disclosure to expressly recite any subject matter, or portion thereof, incorporated by reference herein.

The present disclosure includes descriptions of various embodiments. It is to be understood that the various embodiments described herein are exemplary, illustrative, and non-limiting. Thus, the present disclosure is not limited by the description of the embodiments. Rather, the invention is defined by the claims, which may be amended to recite any features or characteristics expressly or inherently described in or otherwise expressly or inherently supported by the present disclosure. Further, Applicant reserves the right to amend the claims to affirmatively disclaim features or characteristics that may be present in the prior art, but not necessarily expressly described herein. Therefore, any such amendments would comply with the requirements of 35 U.S.C. §112, first paragraph, and 35 U.S.C. §132(a). The various embodiments disclosed and described herein can comprise, consist of, or consist essentially of the features and characteristics as variously described herein.

Various embodiments disclosed herein are directed to methods of treating a gas stream comprising $NO_x$. Such embodiments include contacting a gas stream comprising $NO_x$ gas with ozone, thereby forming oxidation products including nitrogen sesquioxide and nitrogen pentoxide. At least a potion of the nitrogen sesquioxide and nitrogen pentoxide reaction products are reacted with water to form nitric acid, and at least a portion of the nitric acid is recovered and optionally may be applied in some useful purpose. Thus, in contrast to conventional methods for treating $NO_x$-containing gases, all or a portion of the oxidation products resulting from the reaction of the $NO_x$-containing gas with ozone are not directly removed as a waste stream using an aqueous scrubber. Instead, water is reacted with at least a portion of the nitrogen sesquioxide and nitrogen pentoxide oxidation products to form nitric acid, and at least a portion of the nitric acid is recovered and may be recycled or otherwise utilized. The nitric acid used in pickling of stainless steel and other alloys, for example, is expensive and recycling at least a portion of the acid may significantly reduce costs associated with pickling, as well as reduce the amount of waste fluids produced when the $NO_x$-containing gases generated by the pickling process are treated.

Embodiments of methods according to the present disclosure may be further understood by reference to the flow diagram of FIG. 1. In a first step, gaseous $NO_x$, which may be part of a gas stream, and ozone are reacted to produce oxidation products. The oxidation products may include nitrogen sesquioxide ($N_2O_3$) and nitrogen pentoxide ($N_2O_5$). In a second step, which may occur simultaneous with and/or removed in time from the first step, at least a portion of the nitrogen sesquioxide and nitrogen pentoxide react with water to form nitric acid ($HNO_3$). In a third step, at least a portion of the nitric acid is recovered.

Figure 2:
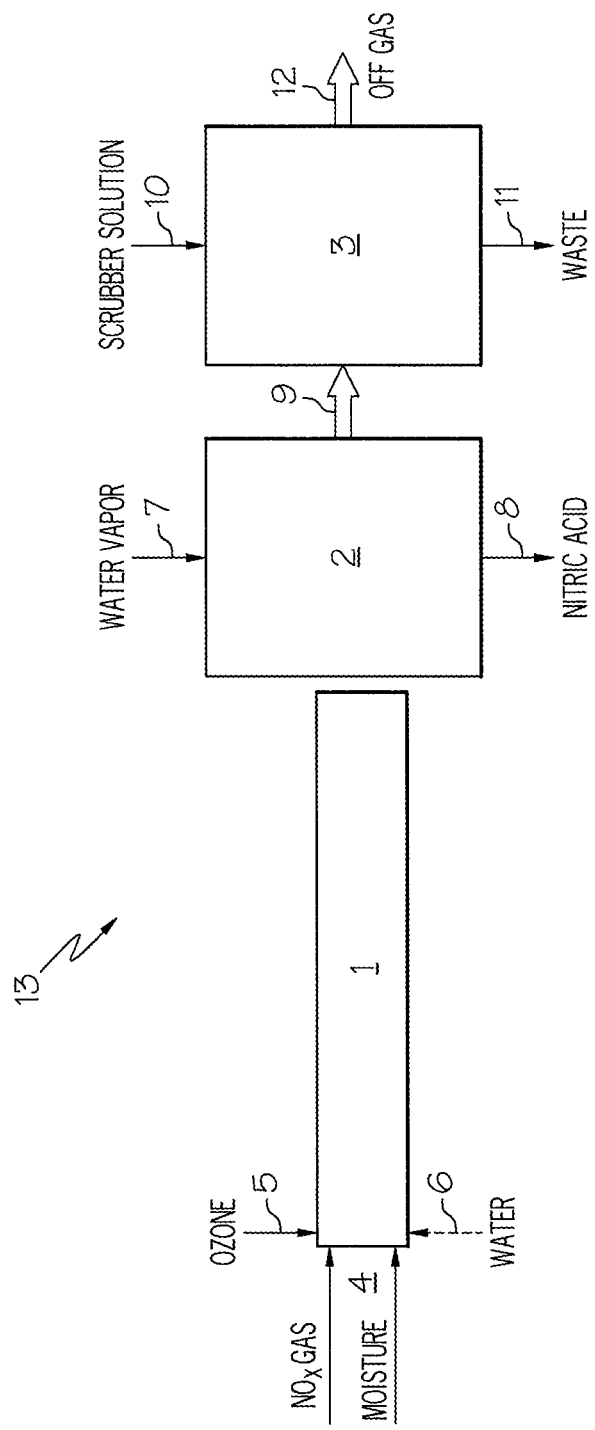
FIG. 2 is a schematic representation of a non-limiting embodiment of a system for treating a gas stream comprising $NO_x$ gas according to the present disclosure.

Various embodiments disclosed herein are directed to systems for treating a gas stream comprising $NO_x$ with ozone and producing and recovering nitric acid. One such embodiment is schematically depicted in FIG. 2, wherein system 13 includes a first chamber 1, a second chamber 2, and, optionally, a third chamber 3. The chambers 1,2,3 may be regions of an apparatus that communicate along a flow pathway. Alternatively, one or more of the chambers 1,2,3 may be separate structures that communicate along a flow pathway.

The first chamber 1 of system 13 receives an NOx-containing gas stream and a gas stream including or consisting of ozone gas and is adapted to mix the streams together. First chamber 1 may include at least a first inlet 4 and a second inlet 5, and includes an interior volume. In certain non-limiting embodiments, the first chamber 1 may have a diameter of at least 24 inches. In certain non-limiting embodiments, the first chamber 1 may be at least 200 feet long. However, it will be understood that the first chamber 1 may have any dimensions and design suitable for mixing together the NOx-containing gas stream and the stream including ozone and thereby facilitating reaction between the NOx and the ozone. In certain non-limiting embodiments, the temperature in the first chamber 1 may be less than 140° F. In certain non-limiting embodiments, the pressure in the first chamber 1 may be 10.5 water column (inches) vacuum. In certain non-limiting embodiments, the flow rate through the first chamber 1 of the NOx-containing gas and the gas including ozone may be at least 500 cubic feet/min. It will be understood that the conditions within the first chamber 1 may be selected to facilitate reaction between the NOx-containing gas stream and the stream including ozone and the further reaction of materials formed in the first chamber 1 to produce nitric acid. The flow rate within the first chamber 1 may be selected to permit adequate residence time in the first chamber 1. If residence time within the first chamber 1 is not adequate, the NOx-containing gas stream and ozone may have difficulty mixing and reacting. In such case, oxidation products may not form in the first chamber 1, but instead might form in the second chamber 2 or third chamber 3. In certain non-limiting embodiments, the residence time in the first chamber 1 is at least 6 seconds.

The first inlet 4 communicates with a source of a gas including $NO_x$. The NOx-containing gas stream preferably does not pass through a scrubber prior to passing through the first inlet 4 into the first chamber 1. Instead, the NOx-containing gas stream preferably passes directly through the first inlet 4 from the source generating the NOx-containing gas stream and is not "pre-treated". The NOx-containing gas stream may be generated from any process that produces NOx gases. For example, in certain non-limiting embodiments, the NOx-containing gas stream is generated during an alloy manufacturing or treatment process or a combustion process. In certain non-limiting embodiments, NOx-containing gas treated by a system according to the present disclosure is produced in a pickling process for treating metals and alloys. In one particular non-limiting embodiment, the $NO_x$-containing gas stream is generated in the headspace above an acid pickling tank or bath that may include, for example, nitric acid, and in which an alloy is immersed (i.e., "pickled") for a time to treat the alloy's surfaces. In certain other non-limiting embodiments, the $NO_x$-containing gas stream is generated by a spray pickling process in which a spray of an acid pickling solution is directed at surfaces of a metal or alloy. In certain non-limiting embodiments, the $NO_x$-containing gas stream generated by an acid pickling process may have a temperature in the range of ambient temperature to 140° F. As is known in the art, the acid solution used in an acid pickling tank, bath, or spray is a solution that includes one or more strong acids and which is used to remove surface impurities such as stains, inorganic contaminants, rust, and scale, from metals and metal alloys. In certain embodiments, the pickling tank, bath, or spray may be used to remove surface impurities from materials selected from titanium, titanium alloys, and stainless steels.

In certain non-limiting embodiments, the pickling bath may include one or more strong acids selected from the group consisting of hydrochloric acid, sulfuric acid, phosphoric acid, nitric acid, hydrofluoric acid, and combinations thereof. In certain specific non-limiting embodiments, the pickling bath may include one or both of nitric acid and hydrofluoric acid. Person having ordinary skill in the art may readily formulate a suitable pickling solution for a particular metal or alloy and, therefore, it is not necessary that the present description include a discussion of how to formulate or apply a pickling solution for a particular metal or alloy. It will be understood that embodiments of the method and system according to the present disclosure may be used with any pickling formulation that generates a $NO_x$-containing gas. More generally, it will be understood that certain embodiments of the method and system according to the present disclosure may be used to process $NO_x$-containing gas produced by any process, apparatus, system, or phenomenon.

In certain non-limiting embodiments of a method or system according to the present disclosure used in connection with a pickling process, the pickling solution within a pickling tank or bath or used in a pickling spray may have a temperature of at least 140° F. However, it will be understood that the pickling solution may have any temperature suitable for pickling a metal or alloy of interest. For example, in certain non-limiting embodiments, the pickling solution may have a temperature less than 140° F. In certain other non-limiting embodiments, the pickling solution may have a temperature equal to or higher than 140° F. In other non-limiting embodiments of a method or system according to the present disclosure used in connection with a pickling process, the pickling bath or tank may hold at least 5700 and as much as 15,000 gallons of pickling solution. However, it will be understood that the pickling bath or tank may hold any volume of pickling solution suitable for providing the desired surface processing of a metal or alloy mill product of interest. As previously noted, in certain other non-limiting embodiments of a pickling process that generates $NO_x$-containing gas, surface impurities such as stains, inorganic contaminants, rust, and scale, may be removed from metals and alloys using spray pickling. As used herein, spray pickling refers to a process of spraying an acid pickling solution on metal and/or metal alloy to remove surface impurities. Spray pickling may minimize or reduce the volume of acid that is used to treat the metal and/or metal alloy, but the process may still produce significant volumes of $NO_x$-containing gas.

Again referring to the system 13 schematically illustrated in FIG. 2, the first inlet 4 may further communicate with a source of moisture (water). In certain non-limiting embodiments of system 13, the moisture and the $NO_x$-containing gas stream enter the first chamber 1 at the same location, which may be, for example, inlet 4. In other non-limiting embodiments, the moisture and the $NO_x$-containing gas stream may enter the first chamber 1 at different locations. In yet other non-limiting embodiments, all or a portion of the moisture introduced into the first chamber 1 may be part of the $NO_x$-containing gas stream. For example, in embodiments of the method and system described herein associated with a pickling process or system, the $NO_x$-containing gas stream may be generated in the headspace of the acid pickling solution and, therefore, may include a certain moisture content as a result of evaporation of water from the acid pickling solution.

The second inlet 5 to chamber 1 of the system 13 communicates with a source of ozone. The ozone source may be, for example, an ozone generator or another known device that produces ozone (not shown), or an ozone storage device. In certain non-limiting embodiments, the ozone generating device may be located "on-site" so that ozone may be produced when needed to treat $NO_x$-containing gas generated by a pickling process or apparatus or another process or apparatus at the site. Because ozone has a short half-life, the ozone preferably is generated proximate the second inlet 5. For example, in certain non-limiting embodiments, an ozone generator device or other ozone source may be located near the second inlet 5. In other non-limiting embodiments, the ozone source may be located near the first inlet 4 and the second inlet 5. The ozone source may provide an ozone-containing gas stream including ozone in any concentration suitable to treat the particular $NO_x$-containing gas stream that is being introduced into the first chamber 1. In certain non-limiting embodiments, the concentration of ozone in the gas stream introduced into the first chamber 1 at second inlet 5 may be in the range of 1 to 16 percent by volume.

In certain non-limiting embodiments of system 13, the second inlet 5, at which a gas including ozone is introduced into the first chamber 1 may be located adjacent (i.e., near to) the first inlet 4 so that $NO_x$ entering the first chamber 1 at the first inlet 4 contacts ozone introduced at the second inlet 5 and suitably reacts to form oxidation products including nitrogen sesquioxide and nitrogen pentoxide. Those having ordinary skill may readily ascertain a suitable minimum, maximum, and/or range of distances between the first inlet 4 and the second inlet 5 so that the $NO_x$ in the $NO_x$-containing gas stream and the ozone in the ozone-containing gas stream react within the first chamber 1 to a degree that results in the particular desired minimum reduction in the concentration of $NO_x$ in the $NO_x$-containing gas stream entering the first chamber 1. The shape and size of the interior volume of the first chamber 1 may be adapted to promote contact between and thereby suitably react the $NO_x$-containing gas stream and the ozone to produce oxidation products including nitrogen sesquioxide and nitrogen pentoxide. These reaction products can be formed in the first chamber 1 by reaction of nitrogen oxides ($NO_x$, including $NO$ and $NO_2$) and ozone ($O_3$) according to the following equations:

$$NO + O_3 \rightarrow NO_2 + O_2$$

$$NO_2 + O_3 \rightarrow NO_3 + O_2$$

$$NO_3 + NO_2 \leftrightharpoons N_2O_5 \quad \text{A.)}$$

$$NO + NO_2 \leftrightharpoons N_2O_3 \quad \text{B.)}$$

The degree to which the $NO_x$ in the $NO_x$-containing gas stream reacts with the ozone in the first chamber 1 to form oxidation products including nitrogen sesquioxide and nitrogen pentoxide depends on many factors including, but not limited to, the flow rates of the gases, residence time, the concentration on $NO_x$ and ozone in the respective gas streams, the temperatures of the reactants, and the particular mixing action that occurs between the gas streams within the first chamber 1. Those having ordinary skill may suitably adjust or influence one or more of these parameters to adjust the reaction rate occurring in the first chamber 1 and achieve the desired level of conversion of $NO_x$ in the $NO_x$-containing gas stream.

In certain non-limiting embodiments of the system 13, the $NO_x$-containing gas stream is not treated in a scrubber prior to being introduced into the interior volume of the first chamber 1 and contacting ozone therein. Also, in certain non-limiting embodiments of a system according to the present disclosure, the $NO_x$-containing gas stream may be mixed with the ozone-containing gas stream in the first chamber using a device adapted to mix gas streams. For example, the $NO_x$-containing gas stream may be mixed with ozone-containing gas stream using a static mixer. As used herein, the term "static mixer" refers to a device that includes a series of fixed elements with a specific geometric design so as to promote patterns of flow division and radial mixing. A static mixer may be used to promote mixing of at least two liquids or at least two gases, to disperse a gas into a liquid, or to disperse at least two immiscible liquids. Although it is believed that a static mixer is not required in the system 13, providing a static mixer may improve system efficiency and reduce the length of the first chamber 1 necessary to allow the gas streams introduced into the first chamber 1 to mix and suitably react. In certain non-limiting embodiments of the system 13, for example, a static mixer may be located in or associated with the first chamber 1 near the first inlet 4 and the second inlet 5. In certain non-limiting embodiments of system 13, a static mixer may be located immediately following the second inlet 5.

At least a portion of the nitrogen sesquioxide and nitrogen pentoxide oxidation products formed in the first chamber 1 further react with water in the interior volume of the first chamber 1 to form nitric acid. As discussed above, water introduced into the interior volume of the first chamber 1 may be, for example, moisture that is already a component of the $NO_x$-containing gas stream introduced into the first chamber 1 at first inlet 4 and/or water introduced into the first chamber 1 from one or more inlets into the first chamber 1 that communicate with one or more water sources. A possible water source 6 is indicated in FIG. 2. It will be understood that the system 13 may be constructed in any suitable way so that a sufficient concentration of water is present in the first chamber 1 to suitably react with oxidation products in the first chamber and form nitric acid. In certain non-limiting embodiments, the first inlet 4 may be located near the water source 6. In certain other non-limiting embodiments, the first inlet 4 and second inlet 5 may be located near the water source 6. It will be understood that the particular design of the system 13 and the first chamber 1 will influence the optimal positioning of the one or more water inlets into the first chamber 1, if such is provided, so as to optimally facilitate reaction of water and oxidation products in the first chamber 1.

Again referring to FIG. 2, the second chamber 2 of system 13 may be located downstream (i.e., in the direction of gas flow) from the first chamber 1. The first and second chambers 1,2 preferably are directly fluidly connected so that the effluent from the first chamber 1 flows to the second chamber 2. The second chamber is adapted to recover nitric acid from the effluent emerging into the second chamber 2 from the first chamber 1. In certain embodiments of the system 13, the second chamber 2 may be a mist eliminator which, as is known to those having ordinary skill, is a device including a large cross-sectional surface area adapted for condensation of liquid from a mist introduced (e.g., injected) into the mist eliminator. A mist eliminator preferably removes mist as a liquid from a gas stream by reducing the velocity of gas as it passes through the mist eliminator, thereby trapping the mist so that it may be removed as a liquid via gravity.

As illustrated in FIG. 2, in certain non-limiting embodiments, the second chamber 2 of system 13 may include a third inlet 7, an interior volume, and an outlet 8 through which solubilized nitric acid is collected or recovered from the interior volume. The third inlet 7 communicates with a source of water vapor which, in certain non-limiting embodiments, is sprayed into the interior volume of the second chamber 2. The interior volume is adapted to contact gaseous effluent from the first chamber 1 with water vapor to thereby solubilize in the water vapor nitric acid in the gaseous effluent from the first chamber 1. The solubilized nitric acid is then collected as an aqueous nitric acid solution and is extracted from the bottom of the second chamber 2 through outlet 8. The concentration of the nitric acid may be adjusted by, for example, controlling the volume of water that is introduced into the system 13 over time. For example, introducing water into the system 13 at a relatively high rate, as a component of the $NO_x$-containing gas stream and/or through one or more water inlets associated with the first chamber 1, may dilute the nitric acid formed in and recovered from the system 13. Alternatively, introducing a lesser volume of water in the system 13 over time may concentrate the nitric acid formed in and recovered from the system 13.

In certain embodiments, the recovered nitric acid is recycled back to the process or apparatus that initially generated the $NO_x$-containing gas that is treated by the system 13. For example, in the embodiment in which the system 13 is associated with a pickling tank, bath, or spray that produces an $NO_x$-containing gas stream treated in the system 13, the nitric acid recovered from the second chamber 2 may be piped or otherwise transferred back to the pickling tank, bath, or spray and used to pickle additional metal or alloy mill products. Alternatively, the nitric acid recovered from the second chamber 2 may be stored, sold, or properly disposed of, for example.

Again referring to FIG. 2, system 13 optionally includes a third chamber 3 that is located downstream from the second chamber 2 and receives the gaseous effluent from chamber 2. In certain non-limiting embodiments, the third chamber 3 may be a scrubber. A scrubber is a device or system that extracts pollutants or other materials from a gas stream. As is known in the art, a scrubber may be a wet scrubber, which uses a liquid to remove materials from a gas stream, or a dry scrubber, which uses a dry material to remove materials from a gas stream. For example, the gaseous effluent from chamber 2 may include un-reacted nitrogen oxides, nitric acid that has not been captured by the second chamber 2, nitric acid produced in regions of the system 13 beyond the second chamber 2, mercury, sulfur oxides, and/or entrained particulates that one wishes to remove from the gas stream exiting the second chamber 2, and such materials may be fully or partially removed using a scrubber in the third chamber 3. For example, nitrogen oxides that are not converted to oxidation products in the first chamber 1 may pass un-reacted through the second chamber 2 and enter the third chamber 3. Such un-reacted nitrogen oxides may be partially or fully removed from the gas stream in chamber 3. Also, for example, nitric acid that is not recovered in the second chamber 2 may enter the third chamber 3 through conduit 9 and be partially or wholly collected in the third chamber 3.

In certain non-limiting embodiments, the third chamber 3 may include a fourth inlet 10, a terminal outlet 12 for releasing a gas to the environment, and a second outlet 11 for collecting waste from the interior volume of the third chamber 3. In embodiments in which the third chamber 3 is a wet scrubber device, the fourth inlet 10 may communicate with a source of a scrubber solution. The scrubber solution may be, for example, a non-caustic solution, such as water, or a caustic solution, such as a water/sodium hydroxide solution. In certain non-limiting embodiments, the particular scrubber solution may be recirculated through the scrubber to neutralize non-recovered nitric acid passing into the third chamber 3. The first outlet 12 releases any nitrogen oxides ($NO_x$) that are not removed in the second chamber 2 or third chamber 3. The second outlet 11 may be used for extracting wastes from the third chamber 3, and the waste may be reused and/or disposed of, as the case may be.

A $NO_x$-containing gas stream treatment system constructed as generally described in the present disclosure can produce a significant volume of nitric acid in a 24 hour period. For example, it is believed that an apparatus constructed as generally shown in FIG. 2 could potentially recover as much as 1350 pounds/day of nitric acid (based on 100% acid) from a waste gas stream including 1200 ppm NOx and flowing at a rate of 4,500 scfm (standard cubic feet per minute). Tests conducted on a prototype system constructed as generally discussed according to the present disclosure and having the general design shown in FIG. 2 successfully produced a significant volume of 42% (volume/volume) nitric acid from a NOx-containing gas stream produced by an alloy pickling apparatus.

This disclosure has been written with reference to various exemplary, illustrative, and non-limiting embodiments. However, it will be recognized by persons having ordinary skill in the art that various substitutions, modifications, or combinations of any of the disclosed embodiments (or portions thereof) may be made without departing from the scope of the invention. Thus, it is contemplated and understood that the present disclosure embraces additional embodiments not expressly set forth herein. Such embodiments may be obtained, for example, by combining, modifying, or reorganizing any of the disclosed steps, components, elements, features, aspects, characteristics, limitations, and the like, of the embodiments described herein. In this regard, Applicant reserves the right to amend the claims during prosecution to add features as variously described herein.

The invention claimed is:

1. A method of treating a gas stream comprising $NO_x$, the method comprising:
   generating a gas stream comprising $NO_x$ from an acid pickling solution in an acid pickling tank, bath, or spray;
   contacting the gas stream comprising $NO_x$ with ozone in a first chamber, thereby forming oxidation products including nitrogen sesquioxide and nitrogen pentoxide;
   directly following the preceding step, reacting at least a portion of the nitrogen sesquioxide and nitrogen pentoxide with water in the first chamber, thereby forming nitric acid in the first chamber;
   collecting at least a portion of the nitric acid in a second chamber in direct fluid communication with the first chamber; and
   recycling the nitric acid from the second chamber into the acid pickling tank, bath, or spray;
   wherein the gas stream comprising $NO_x$ is not treated with a caustic scrubbing solution in a scrubber between generating the gas stream comprising $NO_x$ and recycling the nitric acid.

2. The method of claim 1, wherein the acid pickling solution comprises nitric acid.

3. The method of claim 1, wherein the acid pickling solution has a temperature of at least 140° F.

4. The method of claim 1, wherein generating the gas stream comprising $NO_x$ comprises treating one of a metal and an alloy with the acid pickling solution.

5. The method of claim 4, wherein generating the gas stream comprising $NO_x$ comprises treating one of stainless steel, titanium, and titanium alloys with the acid pickling solution.

6. The method of claim 1, further comprising mixing the gas stream comprising $NO_x$ and the ozone with a mixing device.

7. The method of claim 6, wherein mixing the gas stream comprising $NO_x$ and the ozone comprises mixing in a static mixer.

8. The method of claim 1, wherein collecting at least a portion of the nitric acid comprises collecting solubilized nitric acid in a mist eliminator.

9. The method of claim 8, wherein water vapor is introduced into the mist eliminator.

10. The method of claim 1, wherein a flow rate of the gas stream comprising $NO_x$ is at least 500 cubic feet/min.

11. A method of treating a gas stream comprising $NO_x$, the method comprising:
   generating a gas stream comprising $NO_x$ from a pickling solution;
   contacting the gas stream comprising $NO_x$ with ozone in a first chamber to form oxidation products including nitrogen sesquioxide and nitrogen pentoxide;
   directly following the preceding step, reacting at least a portion of the nitrogen sesquioxide and nitrogen pentoxide with water to form nitric acid;

collecting at least a portion of the nitric acid in a second chamber in direct fluid communication with the first chamber; and recycling the nitric acid from the second chamber into a process or apparatus that generated the gas stream comprising $NO_x$;

wherein the gas stream comprising $NO_x$ is not treated with a caustic scrubbing solution in a scrubber between generating the gas stream comprising $NO_x$ and recycling the nitric acid.

12. The method of claim 11 comprising treating one of a metal and an alloy with a pickling solution comprising the recycled nitric acid.

13. The method of claim 1 comprising introducing the gas stream comprising $NO_x$ to the first chamber at a first inlet and introducing the ozone to the first chamber at a second inlet.

14. The method of claim 13, wherein each of the ozone and the gas stream comprising $NO_x$ have a flow rate of at least 500 cubic feet/min.

15. The method of claim 13 comprising introducing water to the first chamber at a third inlet.

* * * * *